United States Patent
Snelson

(10) Patent No.: US 10,325,106 B1
(45) Date of Patent: Jun. 18, 2019

(54) APPARATUS AND METHOD FOR OPERATING A TRIPLE STORE DATABASE WITH DOCUMENT BASED TRIPLE ACCESS SECURITY

(71) Applicant: MarkLogic Corporation, San Carlos, CA (US)

(72) Inventor: John Snelson, Oxford (GB)

(73) Assignee: MarkLogic Corporation, San Carlos, CA (US)

( * ) Notice: Subject to any disclaimer, the term of this patent is extended or adjusted under 35 U.S.C. 154(b) by 1232 days.

(21) Appl. No.: 14/244,778

(22) Filed: Apr. 3, 2014

Related U.S. Application Data

(60) Provisional application No. 61/808,326, filed on Apr. 4, 2013.

(51) Int. Cl.
*G06F 16/30* (2019.01)
*G06F 21/62* (2013.01)

(52) U.S. Cl.
CPC .................. *G06F 21/6218* (2013.01)

(58) Field of Classification Search
CPC ................................. G06F 21/6218
USPC ........................................ 707/781
See application file for complete search history.

(56) References Cited

U.S. PATENT DOCUMENTS

| | | | | |
|---|---|---|---|---|
| 2008/0243908 A1* | 10/2008 | Aasman | ............ | G06F 17/30241 |
| 2009/0063472 A1* | 3/2009 | Pell | ............ | G06F 17/30696 |
| 2010/0036788 A1* | 2/2010 | Wu | ............ | G06F 17/30286 706/47 |
| 2011/0022636 A1* | 1/2011 | Yalamanchi | ........ | G06F 17/3051 707/783 |
| 2011/0099173 A1* | 4/2011 | Chappell | ........... | G06F 17/30911 707/741 |
| 2012/0221324 A1* | 8/2012 | Machii | ............... | G06F 17/2785 704/9 |
| 2012/0310916 A1* | 12/2012 | Abadi | ............... | G06F 17/30445 707/713 |
| 2013/0346445 A1* | 12/2013 | Mizell | ............... | G06F 17/30908 707/774 |
| 2014/0115001 A1* | 4/2014 | Arroyo | ............ | G06F 17/30967 707/772 |

* cited by examiner

*Primary Examiner* — Irete F Ehichioya
*Assistant Examiner* — Johnese T Johnson
(74) *Attorney, Agent, or Firm* — Cooley LLP

(57) ABSTRACT

A server includes a triple processor with instructions executed by a processor to receive an input document, read and store document restrictions for the input document, specify a first triple permutation, and produce for each triple in the input document a record of the triple in accordance with the first triple permutation and the position of the triple in the document. The server also includes a query processor with instructions executed by a processor to receive a query, match components of the query to triples in a triple repository to form initial triples, remove triples from the initial triples in accordance with document restrictions associated with the triples to form final triples, and return the final triples.

7 Claims, 5 Drawing Sheets

400

| Doc ID | R1 | R2 | R3 | R4 | R5 | R6 | R7 |
|---|---|---|---|---|---|---|---|
| ... | | | | | | | |
| # | Y | Y | N | N | Y | N | N |
| ... | | | | | | | |

| Identifier | Type | Value |
|---|---|---|
| ... | | |
| 3 | IRI | :first-name |
| 4 | IRI | :person4 |
| 5 | IRI | :person5 |
| 6 | STRING | "John" |
| 7 | DECIMAL | 1929 |
| ... | | |

| Subject | Predicate | Object | Doc ID | Position |
|---------|-----------|--------|--------|----------|
| ... | | | | |
| 4 | 3 | 6 | 11 | 5-9 |
| 5 | 0 | 2 | 4 | 25-40 |
| 5 | 1 | 7 | 9 | 13-17 |
| ... | | | | |

US 10,325,106 B1

APPARATUS AND METHOD FOR OPERATING A TRIPLE STORE DATABASE WITH DOCUMENT BASED TRIPLE ACCESS SECURITY

CROSS-REFERENCE TO RELATED APPLICATION

This application claims priority to U.S. Provisional Patent Application Ser. No. 61/808,326, filed Apr. 4, 2013, the contents of which are incorporated herein by reference.

FIELD OF THE INVENTION

This invention relates generally to data search and retrieval. More particularly, this invention relates to techniques for operating a triple store database with document based triple access security.

BACKGROUND OF THE INVENTION

A triple store is a database for the storage and retrieval of triple entities, commonly expressed as a subject, predicate and object. A triple store is optimized for the storage and retrieval of such triples.

Like a relational database, one stores information in a triple store and retrieves it via a query language, such as SPARQL. SPARQL is a Resource Description Framework (RDF) format established by the RDF Data Access Working Group of the World Wide Web Consortium. SPARQL is an acronym derived from SPARQL Protocol and RDF Query Language. SPARQL allows for a query to comprise triple patterns, conjunctions, disjunctions and optional patterns.

Triples can be imported into a triple store and be exported from a triple store using RDF and other data models. RDF is used as a general method for conceptual description or modeling of information that is implemented in web resources, using a variety of syntax notations and data serialization formats. RDF is instrumental in the development of the semantic web, a collaborative movement led by the international standards body the World Wide Web Consortium (W3C). The standard promotes common data formats on the World Wide Web. By encouraging the inclusion of semantic content in web pages, the Semantic Web aims at converting the current web, dominated by unstructured and semi-structured documents into a web of data. There are many formats that can be used to serialize RDF, including RDF/XML, Turtle, Ntriples and the like.

As triple stores grow in popularity, there is a need to develop data security techniques of the type that are available with relational databases. Accordingly, the current disclosure is directed resolving data security problems associated with existing triple store databases.

SUMMARY OF THE INVENTION

A server includes a triple processor with instructions executed by a processor to receive an input document, read and store document restrictions for the input document, specify a first triple permutation, and produce for each triple in the input document a record of the triple in accordance with the first triple permutation and the position of the triple in the document. The server also includes a query processor with instructions executed by a processor to receive a query, match components of the query to triples in a triple repository to form initial triples, remove triples from the initial triples in accordance with document restrictions associated with the triples to form final triples, and return the final triples.

BRIEF DESCRIPTION OF THE FIGURES

The invention is more fully appreciated in connection with the following detailed description taken in conjunction with the accompanying drawings, in which:

FIG. 5 illustrates a restriction table utilized in accordance with an embodiment of the invention.

FIG. 6 illustrates an identifier-type-value table utilized in accordance with an embodiment of the invention.

Like reference numerals refer to corresponding parts throughout the several views of the drawings.

DETAILED DESCRIPTION OF THE INVENTION

Figure 1:
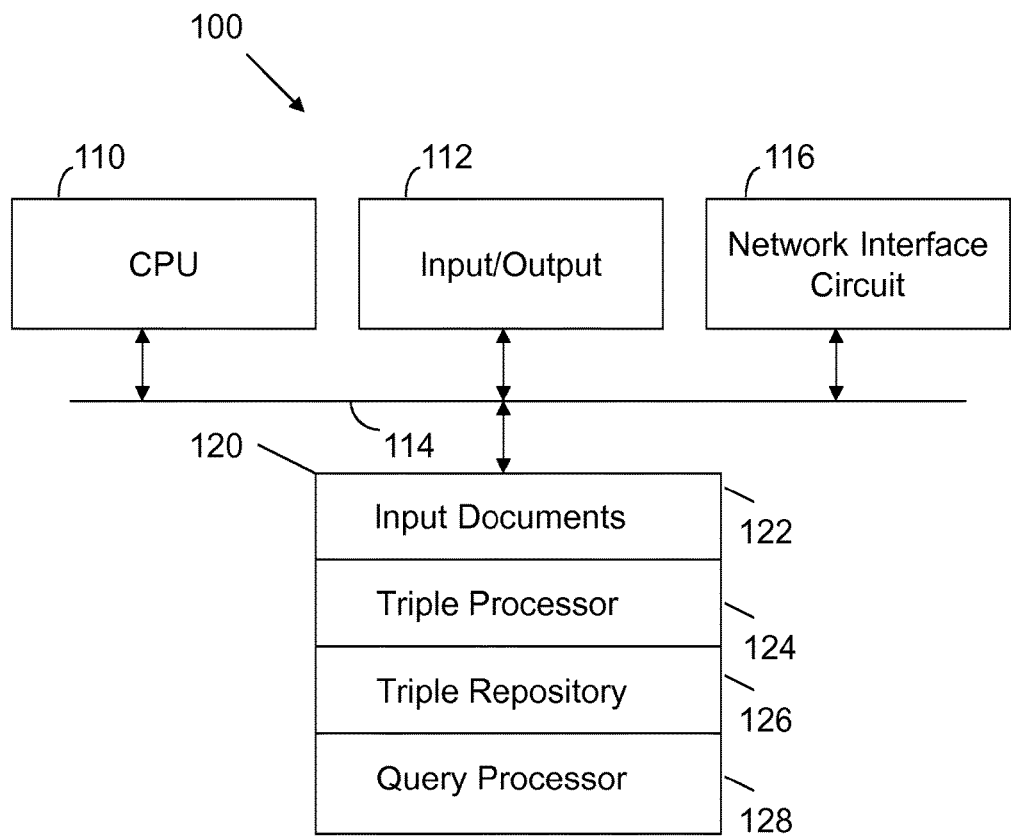
FIG. 1 illustrates a computer configured in accordance with an embodiment of the invention.

FIG. 1 illustrates a computer 100 configured in accordance with an embodiment of the invention. The computer 100 includes standard components, such as a central processing unit 110 and input/output devices 112 connected via a bus 114. The input/output devices 112 may include a keyboard, mouse, touch display and the like. A network interface circuit 116 provides connectivity to a network (not shown), which may be any wired and/or wireless network. A memory 120 is also connected to the bus 114. The memory 120 stores executable instructions to implement operations of the invention.

In one embodiment, the memory 120 stores a set of input documents 122. Alternately, the input documents may be retrieved from the network via the network interface circuit 116. Regardless of the source, the input documents 122 are processed by a triple processor 124, whose operations are described below, to produce a triple repository 126. A query processor 128 is then used to process triple repository queries, as discussed below.

The configuration of computer 100 is exemplary. It should be appreciated that the modules in memory 120 may be combined. Further, it should be appreciated that the modules may be distributed across a network utilizing multiple machines. It is the operations of the invention that are significant, not the particular manner of implementing those operations.

Figure 2:
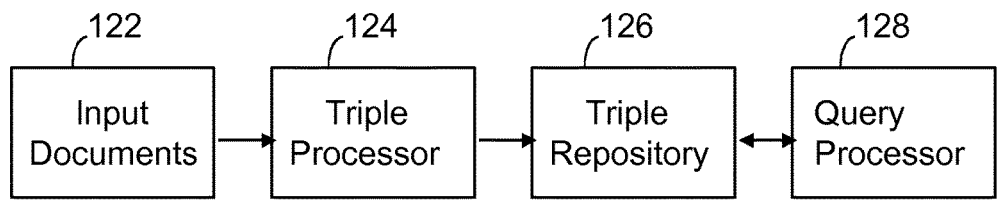
FIG. 2 illustrates interactions between the modules of FIG. 1.

FIG. 2 illustrates the relationship between the modules of FIG. 1. In particular, the figure illustrates that a set of input documents 122 is applied to a triple processor 124, which forms a triple repository 126. A query processor 128 subsequently applies queries to the triple repository 126 to obtain query results.

Figure 3:
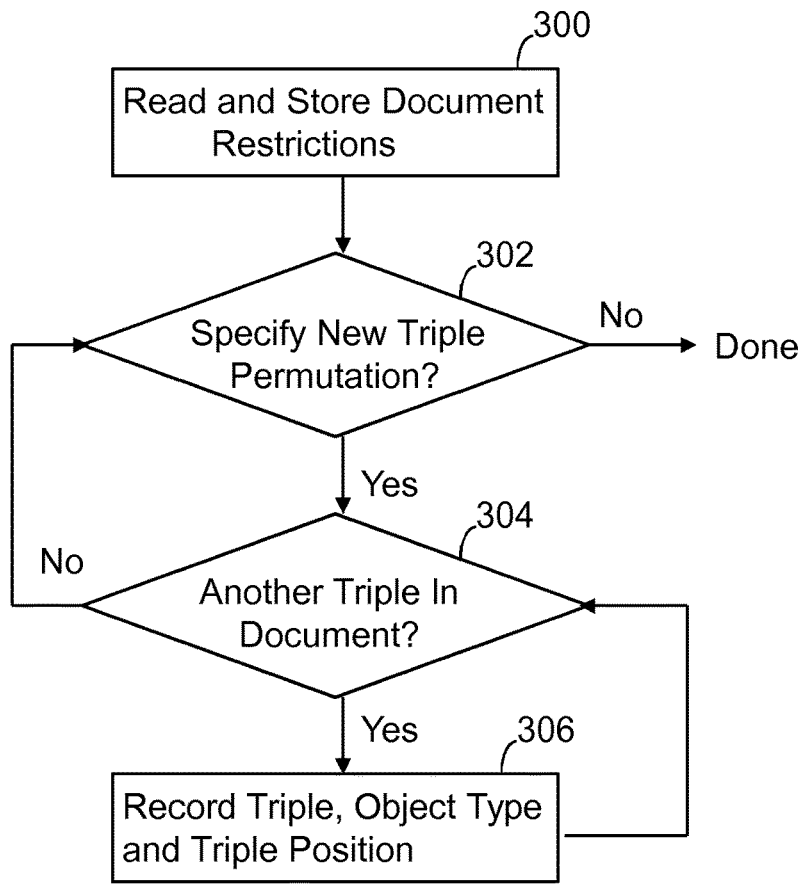
FIG. 3 illustrates processing operations associated with a triple processor configured in accordance with an embodiment of the invention.

FIG. 3 illustrates processing operations associated with an embodiment of the triple processor 124. For each document, document restrictions, if any, are read and stored. The document restrictions may take any number of forms. For example, certain positions in the document may be restricted. Other restrictions may relate to specified individuals, groups of individuals or network domains. Initially, a new triple permutation is specified (302—Yes). For example, the triple may be a subject, predicate, object triple and the first triple permutation may be selected from (1) subject, predicate, object, (2) predicate, subject, object, and (3) object, predicate, subject. If there is another triple in the document (304—Yes), then the triple is recorded along with the position of the triple in the document 306. In one embodiment, an object type for the triple is also recorded. The processing of blocks 304 and 306 continues until all triples in the document have been processed (304—No). At this point, another triple permutation may be specified, in which case the document is processed once again using blocks 304 and 306. Different permutations may be used to provide access to different sort orders and to allow different parts of the triple to be efficiently looked up. If no additional triple permutations are required (302—No), then processing of the document is complete. These operations are performed for each input document.

The processing of FIG. 3 results in a triple repository 126. In one embodiment, the triple repository includes a variety of tables. One table is a restriction table 400, which specifies each document with an identification number and records any data access restrictions associated with that document. FIG. 5 illustrates an example of a restriction table 400. The table has a column to list document identification number. Restriction types R1, R2, R3, R4, R5, R6 and R7 may be listed in additional columns. The applicability of the restriction may then be indicated in the row associated with a specific document. The restrictions may relate to positions in the document, individual user access to the document, user groups access to the document and/or domain access to the document (e.g., only provide access to user from companyx.com). Other restrictions, such as user specified restrictions and query specified restrictions may also be specified.

Figure 4:
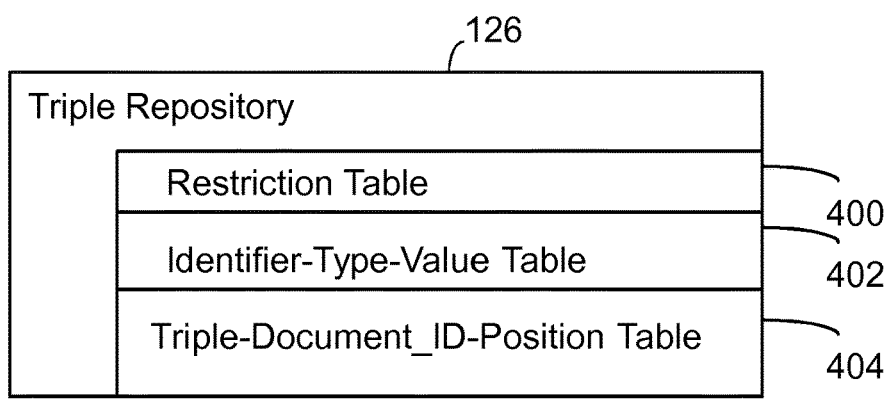
FIG. 4 illustrates a triple repository configured in accordance with an embodiment of the invention.

Returning to FIG. 4, the triple repository 126 may also include an identifier-type-value table 402. FIG. 6 illustrates an example of such a table. In one embodiment, an identifier is used to represent a specific value. This approach facilitates data compression. A data type may also be specified. FIG. 6 illustrates numeric identifiers and different data types, such as an International Resource Identifier (IRI) type, a string type and a decimal type. The table 402 also includes values from the document.

Figure 7:
FIG. 7 illustrates a triple-document_id-position table utilized in accordance with an embodiment of the invention.

Returning to FIG. 4, the triple repository may also include a triple-document_ID-position table 404. FIG. 7 illustrates an example of such a table. In this case, the triple permutation is subject, predicate, object, which form individual columns in the table 404. The identifiers of FIG. 6 populate the table 404. The table 404 also includes a document identification column and a position column (i.e., position of the triple in the document). The position may be a word offset from an initial word in the document. The document_ID and position information allow for granular access restrictions to triples.

Figure 8:
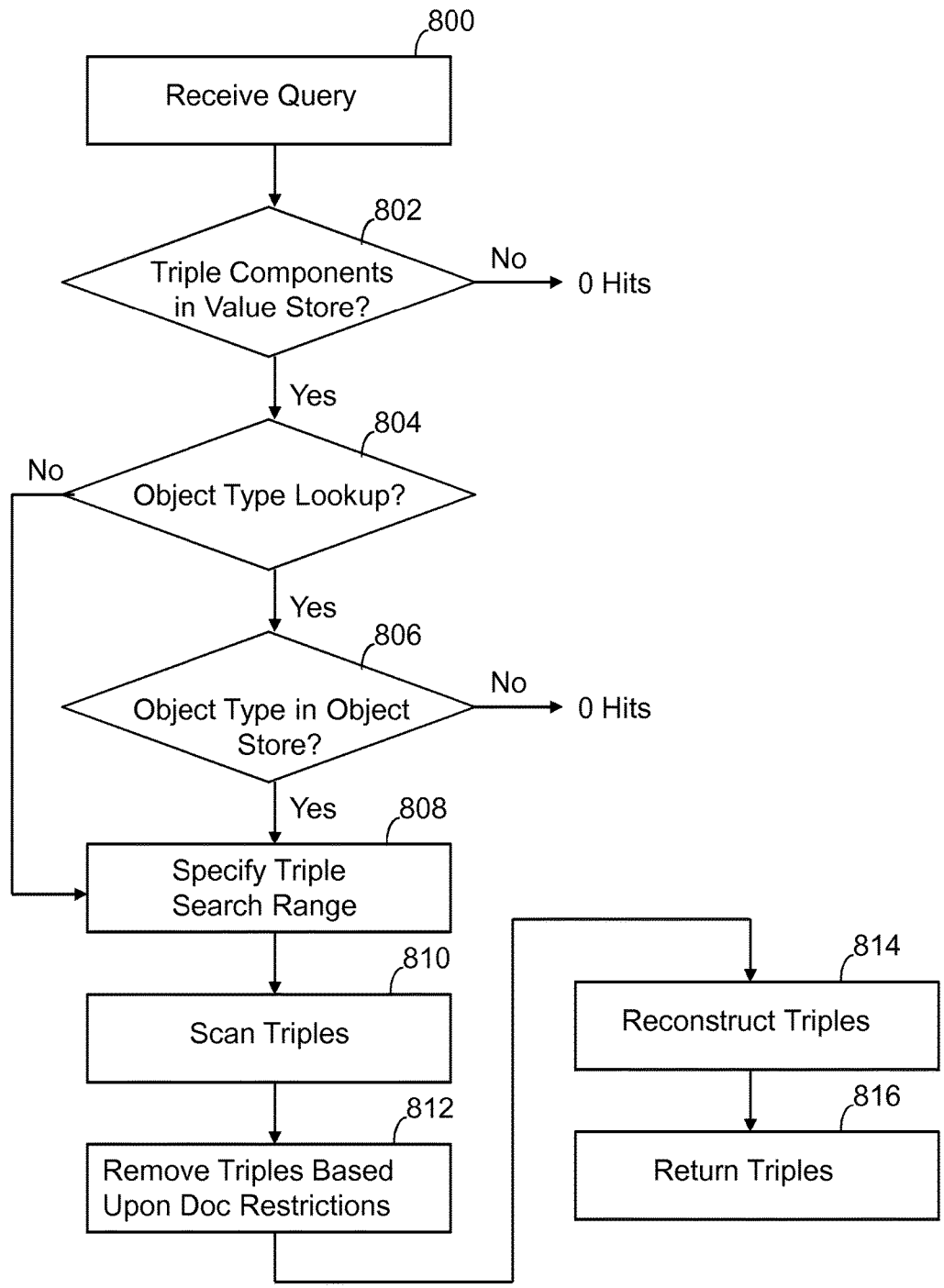
FIG. 8 illustrates query processing operations performed in accordance with an embodiment of the invention.

FIG. 8 illustrates query processing performed by the query processor 128. Initially, a query is received 800, such as a SPARQL query. Components of the query, such as triple components, are compared to values in the value store 802. An example of the value store is the value column of table 402 in FIG. 6. If triple components of the query do not match the values in the value store (802—No), then there are no hits for the query in the triple repository. If values do match (802—Yes), one may optionally perform an object type lookup 804. An example of an object type is shown with the type column of table 402 of FIG. 2. The object type lookup allows for another search parameter. If an object type lookup is implicated (804—Yes), it is determined if the object type is in the object store 806. If not (806—No) there are no hits for the query in the triple repository. If there is an object type match (806—Yes) or if there is no object type lookup specified (804—No), then processing proceeds to block 808, which optionally provides for the specification of a triple search range. The search range may be based upon a value or a wildcard in the query. The search range potentially reduces the number of triples that need to be scanned.

The next operation of FIG. 8 is to scan the triples 810 in the triple repository, for example by scanning table 404 of FIG. 7. This produces initial triples. Triples are then removed based upon document restrictions 812. For example, table 400 of FIG. 5 may be used to identify triples that are subject to security protection. This results in a final set of triples. Depending upon the implementation, triples may be reconstructed 814. For example, the triples of FIG. 7 are specified with identifiers. Those identifiers may be looked up in table 402 of FIG. 6 to retrieve corresponding triple values. The final triples are then returned 816 as a response to the initial query. Alternately, documents containing the triples may be returned.

Thus, the invention indexes triples extracted from documents, while recording the document that the triple was extracted from. This allows the security model of the document to be applied to queries over the triples. Sub-sets of triples may be selected based on properties of the document they are contained in. In addition, documents may be selected based upon the triples they contain.

In one embodiment, the values in table 402 are stripped of non-magnitude information—anything that is not relevant to value equality, like time zone and derived type information. For the object of the triple, type information is stored separately to allow full fidelity triples to be returned directly from the triple index. This information is also used for an RDF specific "sameTerm" comparison required by SPARQL.

In one embodiment, values are stored in a separate value store. The range index's string storage is used for strings in the values. Each range index string value is stored once per unique string. Values are stored on disk in value equality sorted order so that in a given stand value ID order is equivalent to value equality order.

In one embodiment, object type information including specific numerical/string type tag, time zone and derived type is stored in a separate type store. There are far fewer types than values since derived types are not frequently used and no type information is stored for primitive types. Types may be stored in frequency order so that the type IDs for more commonly used types compress better.

In one embodiment, the type store has an index file which stores the offset into the type data file for each stored type. In this embodiment the triple index itself and the value store are stored in compressed 4K blocks. Inside each block there is a header which stores a check sum, index version number, count of triples/values and a starting ordinal. The values are stored in each block compressed using an encoder. A type tag may be stored, followed by the type specific value information and the frequency of the value's occurrence. If encoding of a value exceeds the block size, the block is truncated and saved to disk and the value is encoded at the start of the next block. Value frequencies may be used to estimate the cost of the index access for cost based optimization of SPARQL queries.

The triples may be stored in each block as a difference from the previous triple in the block. Differences of zero may be stored for each component that is the same as that of the previous triple. An encoder may encode a zero as a single bit for efficiency. When the first difference that is not zero is encountered, component values after that are stored as absolute values, not differences. If triple positions are enabled, the ending position is always stored as a difference from the starting position. The triple and value stores have index values of 64 byte chunks (e.g., a single CPU cache line). The first chunk is a header containing checksums, version number and counts. The values index then contains an index of the first value in each 4K block arranged into 64 byte chunks. This is used to find the blocks needed to answer a given lookup based on value. After this, it contains an index of the starting ordinal for each 4K block, which is used to find the block needed to answer a given lookup based on value ID. After the header chunk, the triples index may contain an index of the first two values and permutation of the first triple in each 4K block arranged in 64 byte chunks. This may be used to find the blocks needed to answer a given lookup based on values from the triple.

During a merge, triple values and types may become unused by the triple index and therefore should be considered garbage for removal. Due to the desire to merge on disk triple indexes in a single streaming pass, type and value stores are merged before the triples so it is not known whether a given type or value is garbage. Instead these garbage values are identified during the merge of the triples and this information is written into designated files. During the next merge, the unused types and values identified in the designated files are removed.

When the type store is ordered by frequency it is merged entirely in memory. This is an adequate solution because there should not be a large number of different types. The value and triple stores are merged in a streaming fashion from and to disk directly.

To save memory the triple and value stores are not directly mapped into memory; only their index files are memory mapped. When a block is needed from these indexes it is cached in either the triple cache or the triple value cache. The triple cache stores the compressed block, which scanned while decompressing in linear order. The triple value cache stores decompressed blocks of values so that access to values using an offset can be fast. The type store may be entirely memory mapped.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a triple processor with instructions executed by a processor to:
receive an input document,
read and store document restrictions for the input document, wherein the document restrictions are document position restrictions, individual user access restrictions and user group access restrictions,
specify a first triple permutation,
produce for each first triple permutation in the input document a first triple permutation record and a corresponding position in the document,
specify a second triple permutation, and
produce for each second triple permutation in the input document a second triple permutation record and a corresponding position in the document, wherein the first triple permutation and the second triple permutation are different permutations used to provide access to different sort orders;
wherein each triple in the input document includes a subject, predicate, object triple and the first triple permutation and the second triple permutation are selected from different permutations of (1) subject, predicate, object, (2) predicate, subject, object, and (3) object, predicate, subject.

2. The server of claim 1 wherein the triple processor further comprises instructions executed by the processor to produce for each triple in the input document a record of the triple in accordance with the first triple permutation, an object type and the position of the triple in the document.

3. The server of claim 1 wherein the document restrictions include domain access restrictions, user specified restrictions and query specified restrictions.

4. The server of claim 1 wherein the triple processor includes instructions executed by the processor to produce a triple repository with a plurality of tables.

5. The server of claim 4 wherein the plurality of tables includes a document restriction table.

6. The server of claim 4 wherein the plurality of tables includes an identifier-type-value table.

7. The server of claim 4 wherein the plurality of tables includes a triple-document_id-position table.

* * * * *